Dec. 17, 1940.  A. S. VOLPIN  2,224,939
VALVE
Filed July 11, 1939
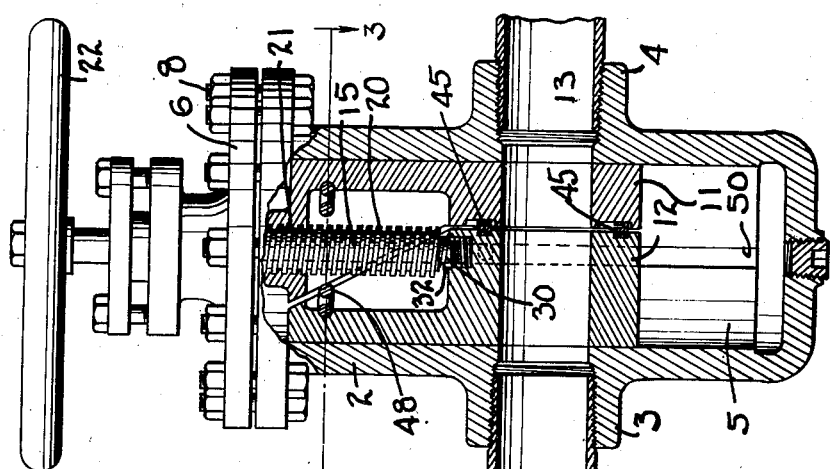
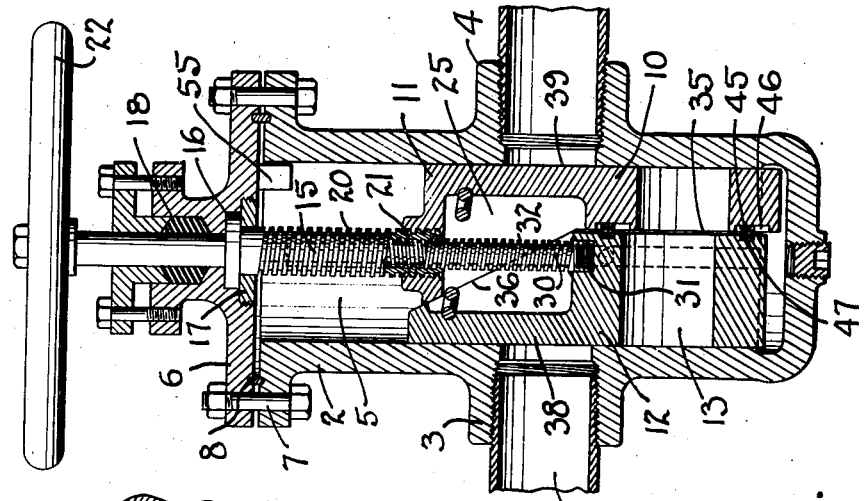
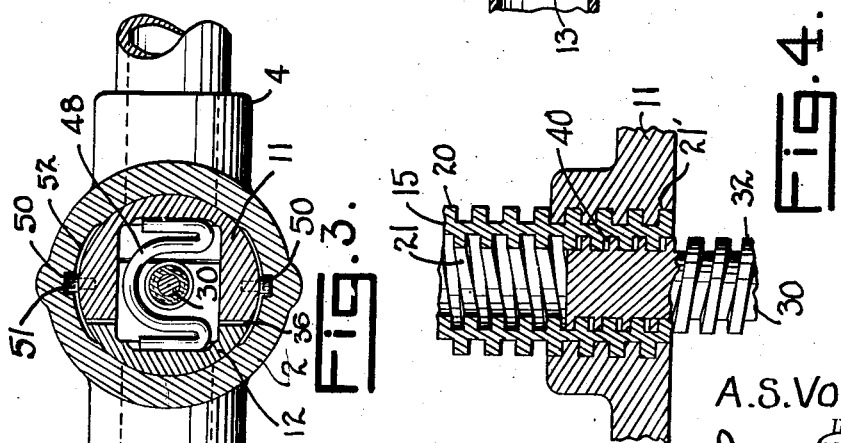
A. S. VOLPIN
INVENTOR.
BY Jesse R. Stone
Lester B. Clark
ATTORNEYS.

Patented Dec. 17, 1940

2,224,939

UNITED STATES PATENT OFFICE 2,224,939

VALVE

Alexander S. Volpin, Houston, Tex.

Application July 11, 1939, Serial No. 283,745

17 Claims. (Cl. 251—68)

The invention relates to a valve and particularly that type of valve which is to be applied to a conduit where high pressures may be encountered and where it is desired to lubricate the parts.

It is one of the objects of the invention to provide a valve housing and valve member where the valve member is of the split type having two parts which are urged against the housing to provide a seal in closed position but where there is no wedging action in open position and wherein there is a differential movement between the valve parts so as to obtain the sealing action in closed position and to release the members for movement as they travel to open position.

Another object of the invention is to provide a differential threaded driving arrangement for a two-part valve member.

Another object of the invention is to provide a closure member for valves wherein the line of separation between the two-part member is perpendicular to the path of travel of the fluid through the valve.

Another object of the invention is to provide a lost motion threaded driving connection for two valve members so that there may be relative movement of one member with respect to the other to create a seal as the valve is closed.

Another object of the invention is to provide a non-rising stem for one part of a two-part valve member and a rising stem for the other part of the valve member wherein there is a differential pitch thread on the valve members to negotiate relative movement between the valve members.

Another object of the invention is to provide for a limited amount of lost motion in the device which moves the valve parts so as to effect a wedging action as the parts move to closed position.

Another object of the invention is to provide a split type of valve member which can be used with the high pressure applied to either side thereof.

Still another object of the invention is to provide a split type valve wherein the valve chamber is completely filled with lubricant and the lubricant is permitted to pass the valve members upon movement of the members.

Another object of the invention is to provide a seal about the passage through a two-part valve member in a lubricated valve so that the lubricant can not leak into the passage through the valve.

Other and further objects of the invention will be readily apparent when the following description is considered in connection with the accompanying drawing; wherein Fig. 1 is a vertical sectional view of the valve to which the invention has been applied and showing the valve in closed position.

Fig. 2 is a vertical sectional view showing the valve in open position.

Fig. 3 is a section taken on the line 3—3 of Fig. 1 and illustrating the device for urging the valve members apart.

Fig. 4 is a broken sectional view showing one arrangement of the driving mechanism for effecting relative movement of the two valve members.

In Fig. 1 the valve housing is indicated generally at 2 and is made up of a body having the pipe line connections 3 and 4 at the opposite sides thereof. This body has a valve chamber 5 therein which is closed by the cap or end member 6 retained in place by suitable bolts 7 which clamp the sealing rings 8 in position.

Inside of the chamber 5 is the closure member 10, which is made up of the valve members 11 and 12 which are in the form of complementary members which are arranged to close the passage 13 through the valve when they are in the position shown in Fig. 1 and to permit flow through the valve when they are in the position of Fig. 2.

One of the principal features of the invention is the mechanism for moving this closure member 10 and particularly the parts 11 and 12 thereof. This mechanism is in the form of a plurality of stems. The outer stem 15 is of the non-rising type and has a flange 16 which is confined in the cap 6 by means of the retainer ring 17 so that it is free to rotate but can not move longitudinally. A stuffing box 18 forms a seal around the outer end of this stem 15.

The outside of the stem 15 is threaded at 20 and the inside is threaded as at 21 so that the stem is both internally and externally threaded.

The external thread 20 is fitted into a thread 21 within the upper end of the valve member 11, so that as the stem 15 is rotated by means of the handle 22 the closure member 11 will be caused to slide in the chamber 5. The inside of the member 11 is hollow as at 25 so as to allow the stem to move into the member as the member rises.

In order to move the complementary member 12 a second stem 30 is fixed therein by being threaded at 31 into the valve member 12. This second stem 30 is externally threaded at 32 and this thread is of a type to mesh with the thread 21 on the inside of the stem 15, so that the stem 30 is of the rising type in that it rises with the valve member 12.

It seems obvious that if the mesh of the threads 20 and 21 were the same that then the valve members 11 and 12 would move uniformly together in the raising and lowering thereof. In view of the fact that it is desirable to have the valve members 11 and 12 wedged apart in the closed position as seen in Fig. 1, it is desirable that there be some relative movement between the parts 11 and 12. These parts are formed as complements of each other in that the two parts together make up the valve member 10. The contacting faces between the two are in the form of vertical faces at 35 where the passage 13 extends through the valve member and in the form of inclined faces at 36 in the upper part of the valve members. In this manner so long as the two parts move together there will be no wedging action tending to separate them. When the member 11, however, moves downwardly relative to the member 12 then the inclined faces 36 will contact each other as seen in Fig. 1, and the valve parts will be wedged away from each other so as to force the outer edge 38 of the member 12 against the side of the chamber 5 and to force the face 39 of the member 11 against the opposite side of the chamber. In this manner any desired pressure may be sealed against, depending upon the pressure which is to be applied to the wheel 22 in the closing of the valve.

To negotiate this differential movement between the parts 11 and 12 the threads 21 and 20 may be of a different pitch. As an illustration, if the threads 20 are of a size such that they are ten threads to the inch then the thread 21 and the thread 32 would be of a pitch of, say, eleven threads to the inch. In this manner as the handle 22 is rotated the valve member 11 would travel at a slightly faster rate, such as the rate of eleven to ten, during the closing movement and when the handle was reversed the opposite would be true so that the wedging action would be almost instantly released as soon as the valve is to be opened.

Another manner of creating this relative movement between the valve members 11 and 12 is illustrated in Fig. 4 wherein the uppermost turns of the threads 32 are cut away to some extent, as seen at 40 in Fig. 4. This is accomplished by cutting away a portion of the thickness of the external thread 32 so that there may be a space formed between the threads 21 when the uppermost threads 32 are in engagement with the threads 21. In this manner a certain amount of lost motion may occur when these thinner threads are the only ones which are in engagement with the threads 21, that is, when the parts are nearly in closed position as seen in Fig. 4. This will allow the threads 20 to compel additional movement of the member 11 because the stem 15 can continue to rotate a slight distance relative to the stem 30 without forcing the valve member 12 any further down in the chamber. The reverse occurs on opening of the valve so that the part 11 moves first to release the friction and then on continued rotation the part 12 begins to rise when the threads 21 engage the threads 32.

It is intended that the chamber 5 will be filled with a suitable lubricant and in order that this lubricant may be maintained in the chamber 5 and not escape into the passage 13 flowing between the valve members 11 and 12 a suitable resilient packing 45 has been disposed in the contacting faces of the members 11 and 12. As seen in Fig. 1, this packing is disposed in an elongated area 46 in the valve member 11 while it is firmly confined in the recess 47 in the valve member 12. This will accommodate the relative sliding movement. The particular type of packing shown is what is generally designated as an accordion packing in that it is capable of compression but will normally remain in expanded position and in the present situation would maintain a seal around the passage 13 to prevent the escape of lubricant.

In order that the valve members 11 and 12 may be normally urged apart and held against the edges of the chamber 5 a spring 48 is disposed between the valve members and this spring is best seen in Fig. 3 where it is formed to pass around the stem 30 but still urge the two valve members apart.

Inasmuch as the chamber 5 is to be filled with a lubricant which will completely enclose the valve members 11 and 12 it seems obvious that as the valve members move a passage will be required for the lubricant to flow around the valve members. To provide for this and to also hold the valve members against turning movement and to guide them in the chamber the channels 50 are formed on the opposite sides of the body in the chamber 5. Small studs 51 carried by the valve member 11 are shown as moving in the slots. The chamber is cut away slightly at 52, however, to permit the passage of lubricant up and down the chamber upon movement of the valve members.

One advantage of the present valve is that either end of the valve may be used as the high pressure end whereas with other types of split closure member valves it is necessary that the same side always be used to withstand the high pressure. In order to indicate to the operator when the valve is in full open position a stop member 55 has been provided inside of the top of the chamber 5 for the valve member 11 to abut against.

Broadly the invention contemplates a valve construction wherein the parts will be wedged in sealing position when the valve is closed and wherein the construction is simple and economical.

What is claimed is:

1. A valve including a housing, a valve member therein made up of a pair of complementary parts engaging each other along inclined faces which cross the center line of the member; and means to positively move said parts including a spindle for each part, said spindles being interthreaded so that rotation of one causes longitudinal travel of the other.

2. In a two-part valve member for valves, a non-rising stem threaded to one part of the valve member so that rotation of the stem causes movement of that part, and a rising stem on the other valve part, said stems being interthreaded so that both of said parts are caused to move.

3. A valve including a housing, a closure member therein including a pair of complementary valve members, a rising stem fixed to one member, a non-rising stem threaded into the other member, said rising stem being in turn threaded to said non-rising stem so that rotation of said non-rising stem executes movement of both of said members.

4. A valve including a housing, a closure member therein including a pair of complementary valve members, a rising stem fixed to one member, a non-rising stem threaded into the other member, said rising stem being in turn threaded to said non-rising stem so that rotation of said non-rising stem executes movement of both of said members, said threads being of a different pitch so as to cause relative movement between said members to seat the members in closed position.

5. A valve including a housing, a closure member therein including a pair of complementary valve members, a rising stem fixed to one member, a non-rising stem threaded into the other member, said rising stem being in turn threaded to said non-rising stem so that rotation of said non-rising stem executes movement of both of said members, and spring means to normally urge said members apart.

6. A valve including a housing, a closure member therein including a pair of complementary valve members, a rising stem fixed to one member, a non-rising stem threaded into the other member, said rising stem being in turn threaded to said non-rising stem so that rotation of said non-rising stem executes movement of both of said members, and a resilient packing between said members.

7. A valve including a housing, a closure member therein including a pair of complementary valve members, a rising stem fixed to one member, a non-rising stem threaded into the other member, said rising stem being in turn threaded to said non-rising stem so that rotation of said non-rising stem executes movement of both of said members, spring means to normally urge said members apart, and a resilient packing between said members.

8. A device for actuating a pair of valve members having abutting inclined faces so that relative longitudinal movement causes wedging of the members to form a seal with the valve housing, comprising a rotatable stem threaded internally and externally, a second stem threaded to fit within said first stem, one of said members being threaded externally on said first stem and said second stem being fixed to the other member whereby when said threaded areas are of different pitch there will be relative longitudinal movement of said members.

9. A device for actuating a pair of valve members having abutting inclined faces so that relative longitudinal movement causes wedging of the members to form a seal with the valve housing, comprising a rotatable stem threaded internally and externally, a second stem threaded to fit within said first stem, one of said members being threaded externally on said first stem and said second stem being fixed to the other member, said second stem being threaded so that said first stem may impart slight longitudinal movement to the member threaded therein after said second stem ceases to move.

10. A device for actuating a pair of valve members having abutting inclined faces so that relative longitudinal movement causes wedging of the members to form a seal with the valve housing, comprising a rotatable stem threaded internally and externally, a second stem threaded to fit within said first stem, one of said members being threaded externally on said first stem and said second stem being fixed to the other member, said second stem being threaded so that said first stem may impart slight longitudinal movement to the member threaded therein after said second stem ceases to move, including threads of reduced thickness adjacent the end of the second stem to provide for some lost motion.

11. A valve having a housing, a multiple part closure member, a chamber in the housing in which said member is movable, a passage through the parts of said closure member to permit movement of gases or liquids through the valve when open, and means to impart uniform differential movement to the parts of said valve member which movement is continuous from terminal to terminal positions.

12. A valve including a housing, a valve chamber therein, a multiple part valve member in said chamber, means to move said members, including a stem for each valve member, said stems being coaxial and interthreaded so that turning of one effects axial movement of the other, said turning stem being threaded into one of said valve parts for rotation so that turning raises and lowers that part.

13. A valve including a housing, a valve chamber therein, a valve member comprising a plurality of parts in said chamber, means to move said parts, including a stem for each valve part, said stems being coaxial, complementary threads thereon so that turning of one effects axial movement of the other, said turning stem being externally threaded into one of said valve parts said complementary threads being of a different pitch than said external threads to effect a differential movement of the valve parts.

14. A valve including a housing, a valve member therein to slide to open and closed position in said housing, said member including a pair of relatively movable complementary parts, and means to simultaneously move said parts from open to closed or from closed to open position at a constantly differential rate.

15. A valve, a housing therefor having ports, a multiple part valve member therein having a transverse passage in each of said parts to register with the ports in said housing to permit passage of fluid when said valve is open, means to move said valve member in said housing to close said valve by moving said passages out of alignment with said ports, said means including a stem to move each valve part, said stems coacting so that the turning of one imparts a rate of travel to the several valve parts which is differential as to said parts.

16. A valve driving mechanism for operating a multiple part valve member from terminal to terminal positions in its housing, said driving mechanism consisting of multiple spindles threaded to different pitches so that turning of one spindle imparts similar directional movement to the multiple parts of said valve at a differential rate.

17. A valve housing, a multiple part valve therein, a single operative means to move the individual parts of said valve in said housing in a similar direction and at a uniform differential rate of travel continuous from terminal to terminal positions, said means including a plurality of stems.

ALEXANDER S. VOLPIN.